United States Patent
Hamaguchi

(10) Patent No.: US 8,998,758 B2
(45) Date of Patent: Apr. 7, 2015

(54) CHAIN

(71) Applicant: Tsubakimoto Chain Co., Osaka (JP)

(72) Inventor: Shuuji Hamaguchi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 190 days.

(21) Appl. No.: 13/705,260

(22) Filed: Dec. 5, 2012

(65) Prior Publication Data

US 2013/0165285 A1 Jun. 27, 2013

(30) Foreign Application Priority Data

Dec. 22, 2011 (JP) ................. 2011-281275

(51) Int. Cl.
*F16G 13/04* (2006.01)
*F16G 13/08* (2006.01)

(52) U.S. Cl.
CPC ............... *F16G 13/04* (2013.01); *F16G 13/08* (2013.01)

(58) Field of Classification Search
CPC ........... F16G 13/04; F16G 5/18; F16G 13/06; B21L 15/005; F16H 9/24
USPC ................. 474/212, 213, 214, 215
See application file for complete search history.

(56) References Cited

U.S. PATENT DOCUMENTS

| | | | | |
|---|---|---|---|---|
| 3,540,302 A | * | 11/1970 | Bendall | 474/229 |
| 3,742,776 A | * | 7/1973 | Avramidis | 474/215 |
| 4,010,656 A | * | 3/1977 | Jeffrey | 474/215 |
| 4,130,026 A | * | 12/1978 | Jeffrey | 474/215 |
| 4,186,617 A | * | 2/1980 | Avramidis et al. | 474/229 |
| 4,581,001 A | * | 4/1986 | Rattunde et al. | 474/214 |
| 4,904,231 A | * | 2/1990 | Zimmer | 474/214 |
| 5,236,399 A | * | 8/1993 | Sugimoto et al. | 474/215 |
| 5,242,333 A | * | 9/1993 | Sugimoto et al. | 474/212 |
| 5,372,554 A | * | 12/1994 | Okuda | 474/206 |
| 5,651,746 A | * | 7/1997 | Okuda | 474/215 |
| 6,260,345 B1 | * | 7/2001 | Kanehira et al. | 59/4 |
| 6,277,046 B1 | * | 8/2001 | Ohara et al. | 474/217 |
| 6,387,003 B2 | * | 5/2002 | Horie et al. | 474/215 |
| 6,439,378 B1 | * | 8/2002 | MacLachlan | 198/850 |
| 6,749,059 B2 | * | 6/2004 | Gundlach et al. | 198/851 |
| 7,055,678 B2 | * | 6/2006 | Gundlach et al. | 198/851 |
| 7,682,273 B2 | * | 3/2010 | Mott et al. | 474/215 |
| 2003/0233821 A1 | * | 12/2003 | Matsuda | 59/5 |
| 2004/0176201 A1 | * | 9/2004 | Mott et al. | 474/215 |

(Continued)

FOREIGN PATENT DOCUMENTS

| | | |
|---|---|---|
| JP | 07/081611 | 12/1987 |
| JP | 62-196950 | 12/1987 |
| JP | 05-312238 | 11/1993 |

(Continued)

*Primary Examiner* — Henry Liu
(74) *Attorney, Agent, or Firm* — Howson & Howson LLP

(57) ABSTRACT

In a transmission chain, interleaved links are articulably connected by connecting pins, each connecting pin comprising two rocker pins arranged to roll on each other. Pin holes in each of at least two overlapping link plates in each interleaved pair of link plates are shaped so that each rocker pin moves with one of the overlapping link plates and is engageable with a bend-blocking surface in the pin hole in the other of the two overlapping link plates when the two overlapping link plates are in a straight part of the chain. The engagement of the rocker pins with the bend-blocking surfaces of the pin holes prevents the links from bending backward beyond their straight condition, i.e., in an outward direction, opposite to the inward direction in which the links bend relative to each other when engaging a sprocket.

2 Claims, 4 Drawing Sheets

(56) References Cited

U.S. PATENT DOCUMENTS

2005/0070389 A1* 3/2005 Morishige .................... 474/213
2008/0312020 A1* 12/2008 Simonov et al. ............. 474/215

FOREIGN PATENT DOCUMENTS

| JP | 2001-173732 | 6/2001 |
| JP | 2004028154 | 1/2004 |

* cited by examiner

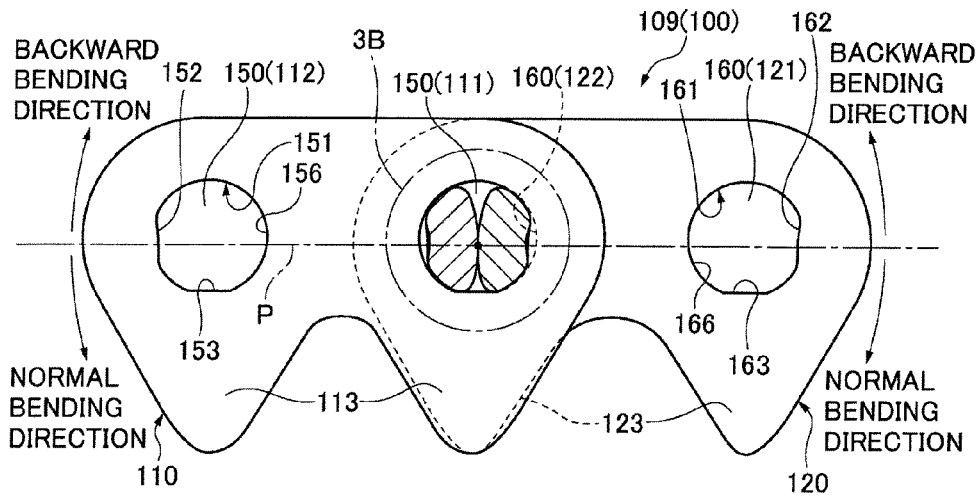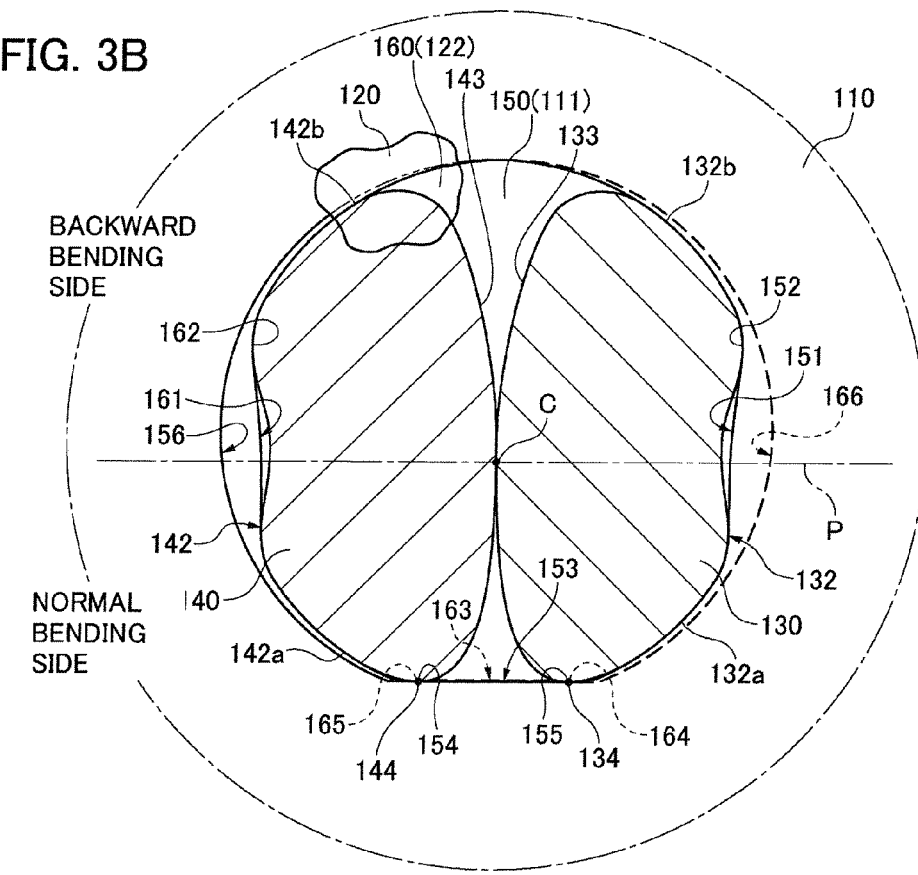

CHAIN

CROSS REFERENCE TO RELATED APPLICATIONS

The disclosure of Japanese Patent Application No. 2011-281275, filed Dec. 22, 2011, and on which this application claims priority, is herein incorporated by reference in its entirety.

FIELD OF THE INVENTION

This invention relates to a chain comprising a plurality of first links, a plurality of second links, and a plurality of connecting pins each composed of first and second rocker pins and bendably connecting the first links with the second links. The invention relates more specifically to a shape of a pin hole provided through the first and second links and into which the first and second rocker pins are inserted together. The invention is applicable to various different kinds of transmission chains, for example, a silent chain used as a timing chain in an automobile engine.

BACKGROUND OF THE INVENTION

In some types of known silent chains for transmitting power between rotating sprockets, first and second links, composed respectively of a plurality of first link plates and a plurality of second link plates, are arranged alternately along the length of the chain with their link plates interleaved and connected articulably by rocker-type connecting pins. Each of the connecting pins is composed of two rocker pins arranged to roll on each other. The connecting pins extend through aligned pin holes in the overlapping parts of the first and second link plates.

The first and second links bend relative to each other about axes approximately centered on the connecting pins. As the chain engages with and disengages from a sprocket, a periodic, so-called "polygonal" action takes place which can cause a phenomenon referred to as "string vibration," i.e., vibration in a direction orthogonal both to the longitudinal direction of the chain and to the direction of the width of the chain. String vibration therefore takes place in the plane in which the chain bends as it travels around the sprockets with which it is in mesh. String vibration generates noise and causes abrasion between the rocker pins and the edges of the pin holes in the link plates, through which the rocker pins extend.

When the frequency of the polygonal action coincides with or approaches the natural resonance frequency of a free span of the chain, the magnitude of the string vibration increases causing increased noise and abrasion.

In order to suppress string vibration, attempts have been made to prevent adjacent links from being put into a backwardly bent condition, i.e., a condition in which one of two adjacent links bends outward relative to the other beyond a straight condition, in a direction opposite from the direction in which bending takes place when the links begin to engage a sprocket. Examples of such chains are described in United States patent publication 2003/0233821, U.S. Pat. No. 6,387,003, and laid-open Japanese Utility Model Application S62-196950.

In some of these chains, gaps are provided between the rocker pins and the bend blocking surfaces when the adjacent links are in the straight condition. When the gaps are small, they reduce string vibration to some extent compared to a case in which there is no bend-blocking surface. However, the gaps still allow string vibration at a significant amplitude, and allow noise to be generated by contact generated between the rocker pin and a bend-blocking surface when the amplitude of the string vibration increases.

In other such chains a bend-blocking surface is provided with a projection that blocks the adjacent links from bending backward by contacting a rocker pin. Here a concentration of stress occurs which can impair the durability of the link plates and therefore impair the overall durability of the chain.

Accordingly, there is a need for a chain that reduces noise and abrasion caused by string vibration, that reduces the noise caused by contact between the rocker pins and the edges of the pin holes that results from string vibration, and that improves the durability of the link plates and the overall durability of the chain.

SUMMARY OF THE INVENTION

Briefly, the invention is a transmission chain in which interleaved links are articulably connected by connecting pins, each connecting pin comprising two rocker pins arranged to roll on each other. Pin holes in each of at least two overlapping link plates in each interleaved pair of link plates are shaped so that each rocker pin moves with one of the overlapping link plates and is engageable with a bend-blocking surface in the pin hole in the other of the two overlapping link plates when the two overlapping link plates are in a straight part of the chain. The engagement of the rocker pins with the bend-blocking surfaces of the pin holes prevents the links from bending backward beyond their straight condition, i.e., in an outward direction, opposite to the inward direction in which the links bend relative to each other when engaging a sprocket.

The chain in accordance with the invention comprises a plurality of first links each composed of one or more first link plates, and a plurality of second links each composed of one or more second link plates. The first and second links are arranged in alternating relationship, with the first and second link plates of each adjacent pair of links being interleaved. The links are connected by a plurality of connecting pins, each composed of a first and second rocker pin that have mutually engaging surfaces that allow the first and second rocker pins to roll against each other each of said connecting pins extends through a first pin hole of each link plate of a first link and through a second pin hole of each link plate of an adjacent second link to connect adjacent first and second links together while permitting relative articulating movement of the connected links in a plane to which the pins extend perpendicularly. The permitted articulating movement of the adjacent links of the chain is sufficient to allow the chain, as it comes into engagement with a sprocket, to bend in an inward direction from a straight condition to a bent condition in which it is bent around the sprocket, and, as it disengages from the sprocket, to revert from the bent condition to a straight condition. Each first pin hole has a flat first bend-blocking surface and each second pin hole has a flat second bend-blocking surface. Each first rocker pin has a first contact portion capable of mutual contact with a second bend-blocking surface, and each second rocker pin has a second contact portion capable of mutual contact with a first bend-blocking surface. The bend-blocking surfaces and contact portions are positioned so that mutual contact of the bend-blocking surfaces and the contact portions prevents the chain from being bent in an outward direction opposite from the inward direction beyond the straight condition.

Because the first and second bend-blocking surfaces are flat, it is possible to prevent concentration of stress from at bend-blocking surfaces when loads are applied to the bend-blocking surfaces by the contact portions of the rocker pins. Accordingly, it is possible to improve the durability of the link plates and the overall durability of the chain.

Because the adjacent links are prevented from bending backward by contact between the first contact portion and the second bend-blocking surface and by contact between the second contact portion and the first bend-blocking surface immediately as adjacent links reach their straight condition, it is possible to suppress string vibration in the free span of the chain, to reduce noise generated by string vibration, and to reduce abrasion at the first and second contact portions and at the first and second hole forming surfaces.

In addition, because no gap is created between the first contact portion and the second bend-blocking surface when the chain is in its straight condition, the amplitude of the string vibration in the free span of the chain is smaller than in the case where a gap is created between the contact portion of the rocker pin and the bend-blocking surface of the pin hole when the chain is in the straight condition.

Accordingly, it is possible to enhance the suppression of string vibration and to achieve further improvements in noise reduction and abrasion resistance. It is possible to reduce the noise resulting from contact, caused by string vibration, between contact portions of the rocker pins and the bend-blocking surfaces of the pin holes in the link plates.

The first and second bend-blocking surfaces can be planar surfaces disposed in planes parallel to the length of the chain when the part of the chain in which the first and second bend-blocking surfaces are located is in a straight condition. In this case, the direction of tension in the chain acting on the first and second pins is substantially parallel to the first and second bend-blocking surfaces when the contact portion are in contact with the bend-blocking surfaces. Therefore, the component of tensile force acting in a direction orthogonal to the bend-blocking surfaces when the chain is straight is much smaller that it would be in the case of bend-blocking surfaces inclined with respect to the pitch plane. Accordingly, any influence resulting from a component of tensile force applied to rocker pins is almost completely eliminated.

The parallel relationship between the pitch plane and the flat bend blocking surfaces also reduces abrasion of the contact portions of the pins and of bend-blocking surfaces caused by force components that tend to press the contact portions toward the bend-blocking surfaces. Consequently, the durability of the rocker pins and the link plates, and the overall durability of the chain are improved. The parallel relationship also avoids separation of the contact surfaces from the bend-blocking surfaces and therefore reduces contact noise.

In an embodiment of the invention, each first contact portion is in the form of a plane and capable of surface-to-surface contact with a second bend-blocking surface (that is, face-to-face contact, or contact over a the entirety of two-dimensional area), and each second contact portion is in the form of a plane and capable of surface-to-surface contact with a first bend-blocking surface. Each first contact portion of each connecting pin comes into surface-to-surface contact with a second bend-blocking surface, and each second contact portion of the same connecting pin comes into surface-to-surface contact with a first bend-blocking surface when the part of the chain in which said connecting pin is located is in a straight condition.

With this arrangement, surface pressure acting between the contact portions and the bend-blocking surfaces is reduced. Accordingly, it is possible to achieve still greater suppression of abrasion in contact portions and bend-blocking surfaces and to improve the durability of the rocker pins and of the link plates.

The flat first and second bend-blocking surfaces of the pin holes through which each connecting pin extends can be coplanar when the part of the chain in which the connecting pin is located is in a straight condition.

With this arrangement, the first and second link plates can be arranged so that the bend blocking surfaces are located substantially in one imaginary plane, and assembly is facilitated because it becomes easier to insert the first and second pins into the pin holes of overlapping sets of first and second link plates.

Because the first and second planes of all of the first and second pin holes through which the first and second rocker pins penetrate contact the first and second rocker pins when the adjoining link plates are in a straight condition, the loads acting between the rocker pins and the first and second planes when string vibration occurs are dispersed. The maximum stress at the first and second rocker pins and at the first and second planes is reduced, and as a result, the durability of the first and second rocker pins and of the first and second plates can be improved still further.

BRIEF DESCRIPTION OF DRAWINGS

FIG. 3A is a cross-sectional view as seen through section plane 3-3 in FIG. 2;

FIG. 3B is an enlarged view of the part of the chain within the area defined by the broken line circle 3B in FIG. 3A;

FIG. 4B is an enlarged view of the part of the chain within the area defined by the broken line circle 4B in FIG. 4A.

DETAILED DESCRIPTION OF THE PREFERRED EMBODIMENTS

Figure 1A:
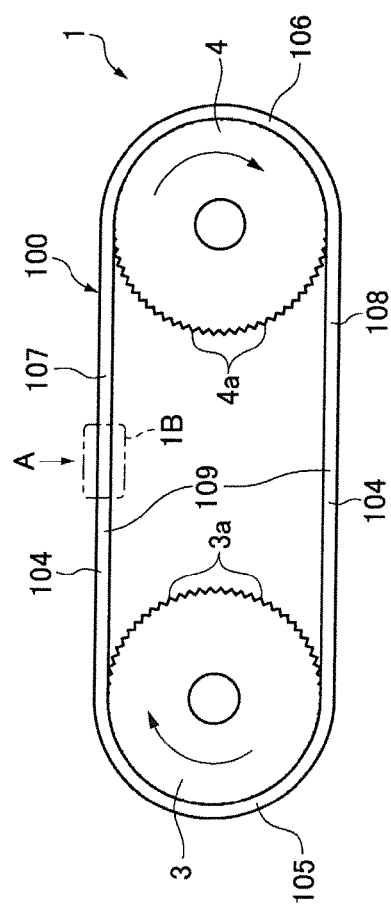
FIG. 1A is a schematic side elevational view of a chain transmission incorporating a silent chain according to the invention.

The silent chain 100 in FIG. 1 is an endless chain in a chain transmission 1 and is engaged with sprockets 3 and 4, sprocket 3 being a driving sprocket having a plurality of sprocket teeth 3a and sprocket 4 being a driven sprocket having a plurality of sprocket teeth 4a.

Figure 1B:
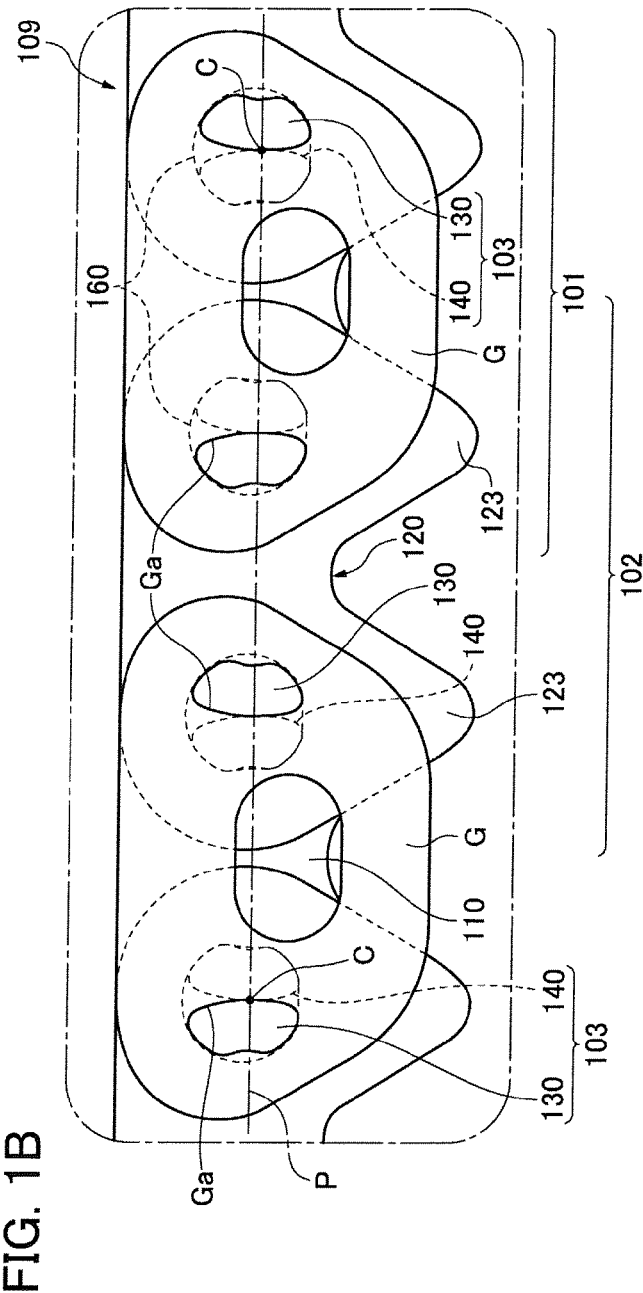
FIG. 1B is an enlarged side elevational view of part of the chain within the area defined by the broken line rectangle A in FIG. 1A.
Figure 2:
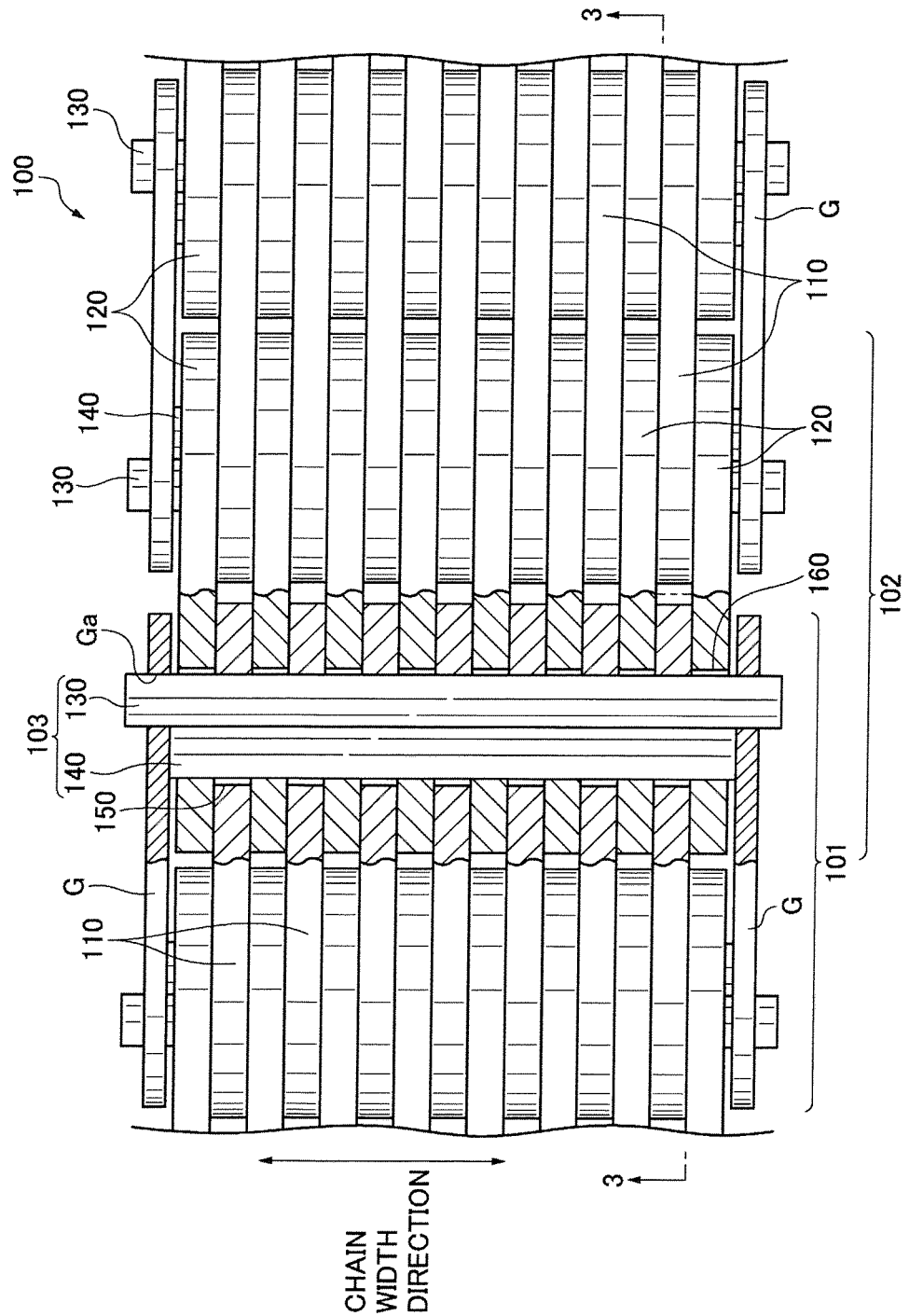
FIG. 2 is an enlarged plan view, partly in cross-section, of part of the chain shown in FIG. 1A, as seen along the direction of arrow A in FIG. 1A.

As shown in FIGS. 1B and 2, the chain 100 includes guide rows 101, each comprising a plurality of first links, and non-guide rows 102, each comprising plurality of second links. The guide rows 101 are connected in alternating, interleaved, relationship with the non-guide rows 102 by two-part connecting pins 103. The connecting pins allow articulation of the guide rows relative to the adjacent non-guide rows so that the chain can bend in a plane to which the axes of rotation of the sprockets are perpendicular.

Each guide row 101 is composed of a pair of guide plates G and a plurality, e.g., seven, of intermediate link plates 110, referred to herein as "first plates." One of the two parts of each connecting pin 103 is fixed to each of a pair of guide plates in opposed relationship to each other on opposite sides of the chain.

Each non-guide row 102 is composed of a plurality of second link plates 120 the number of which exceeds by one the number of first plates in a guide row. Thus, in the embodiment illustrated in FIG. 2, the number of first plates is seven and the number of second plates is eight.

Each connecting pin 103 is composed of a first rocker pin 130 (referred to as a "first pin") and a second rocker pin 140 (referred to as a "second pin"). The second pin is shorter than the first pin. The first and second pins 130 and 140 may have the same or different cross-sectional shapes in a plane orthogonal to the direction of the width of the chain.

As shown in FIG. 2, both pins 130 and 140 extend together through pin holes 150 in the first plates 110 and through pin holes 160 of the second plates 120.

As shown in FIGS. 1B and 2, each guide plate G is provided with a pair of pin holding holes Ga for holding first pins 130 of two successive connecting pins at positions separated from each other in direction of the length of the chain. Each first pin 130 is fixed non-rotatably in a pin holding hole Ga by a suitable means such as press-fitting, caulking, or a stop pin.

First plates 110 are arranged in each guide row 101 between opposite guide plates G in uniformly spaced relationship in the direction of the width of guide row. Second plates 120 are arranged in each non-guide row 102 in interleaved relationship with the plates of the two adjacent guide rows.

The first and second plates 110 and 120 have the same shape in the embodiment illustrated. However, in other embodiments it is possible for the first plates to have a shape different from that of the second plates.

As seen in FIG. 3, the first plate 110 is provided with first and second through holes 111 and 112, which are separated from each other in the direction of the length of the chain. The first plate is also formed with a pair of teeth 113, engageable with sprocket teeth 3a and 4a, shown in FIG. 1A. The second plate 120 is similarly provided with longitudinally separated first and second through holes 121 and 122, and a pair of teeth 123, also engageable with sprocket teeth.

The first and second through holes 111 and 112, in a first plate 110, are symmetrical relative to a with respect to a plane midway between the holes and orthogonal to a pitch plane P shown in FIGS. 3A and 3B. First and second through holes 121 and 122, in a second plate 120, are similarly symmetrical about a plane midway between the holes and orthogonal to the pitch plane P. While the first and second pin holes 150 and 160 in the illustrated embodiment have the same shape, it is possible to realize the advantages of the invention in a chain in which the pin holes of the respective first and second links have different shapes, and even in a chain in which the two pin holes in each link plate have different shapes.

As shown in FIG. 1A, the chain 100 has free spans 104 not engaged with the sprockets, and bent portions 105 and 106 wrapped around the respective sprockets 3 and 4.

In the case of a the chain transmission that also includes a chain guide in sliding engagement with the chain, or an idler sprocket, the free spans of the chain are those parts of the chain that are neither engaged with a sprocket nor in contact with a chain guide or idler sprocket.

As shown in FIG. 1B, one or more guide rows 101 and one or more non-guide rows 102 are connected to form a straight part 109 of the chain. Straight parts are formed in the free spans 104 both on the slack side 107 and on the tension side 108 of the chain.

As shown in FIGS. 1B and 3B, the rocker pins 130 and 140 are in contact with each other along a contact line C, which is shown as a point in the drawings because it extends in the direction of the width of the chain. When the chain is straight, the contact line C is located substantially on a pitch plane P, which passes through central regions of the pin holes. The term "substantially" is used because minor deviations from exact coincidence of the contact lines with the pitch plane will not affect the proper operation of the chain, and particularly its ability to prevent outward bending of the free spans.

As the chain 100 engages a sprocket, adjacent links shift from the straight condition to an inwardly bent condition, and as the chain disengages from a sprocket, the adjacent links shift from the inwardly bent condition back to the straight condition. As shown in FIGS. 3A and 3B, the inner surface 151 of the pin hole 150 is composed of a seating surface 152 on which the first pin 130 seats, a first plane 153 that is smoothly continuous with the first seating surface 152 and is located on the side of pitch plane P toward with the chain bends as it comes into engagement with a sprocket, and a first bend-permitting surface 156 that continues from the first plane 153, and extends through the pitch plane P and continues smoothly to the first seating surface 152.

The first plane 153 is parallel to the pitch plane P when the chain is straight, and contains a first bend-blocking surface 154 and a first supporting surface 155.

In a similar manner, the inner surface 161 of the second pin hole 160 has a second seating surface 162 on which the second pin 140 seats, a second plane 163 that is smoothly continuous with the second seating surface 162 and is located on the side of the pitch plane P toward with the chain bends as it comes into engagement with a sprocket, and a second bend-permitting surface 166 that continues from the second plane 163, and extends through the pitch plane P, continuing smoothly to the second seating surface 162.

The second plane 163 is also parallel to the pitch plane P when the chain is straight, and contains a second bend-blocking surface 164 and a second supporting surface 165.

The first and second planes 153 and 163 are located substantially in one imaginary plane when the part of the chain in which they are located is in a straight condition, i.e., it forms a straight part 109 as shown in FIG. 1B.

Meanwhile, as seen in FIG. 3B, the first pin 130 has a first back surface 132 that seats on the first seating surface 152, a convex, substantially arc-shaped first rolling surface 133, and a first contact portion 134 that is smoothly continuous both with the first back surface 132 and with the first rolling surface 133. This contact portion 134 is on the side of the pitch plane toward which the chain bends as it engages a sprocket, and is positioned to contact the second bend-blocking surface 164.

Similarly, the second pin 140 has a second back surface 142 that seats on the second seating surface 162, a convex, substantially arc-shaped second rolling surface 143, and a second contact portion 144 that is smoothly continuous both with the second back surface 142 and with the second rolling surface 143. This contact portion 144 is also on the side of the pitch plane toward which the chain bends as it engages a sprocket, and is positioned to contact the first bend-blocking surface 154.

The first and second rolling surfaces 133 and 143 contact each other at the pin contact line C. The first and second contact portions 134 and 144 are composed of substantially arc-shaped surfaces.

In the following explanation, corresponding parts will be described in parentheses.

The first pin 130 (the second pin 140) is held so as not to be capable of rolling relative to the first plate 110 (the second plate 120) and moves as a body with the first plate 110 (the second plate 120) as the chain bends from a straight condition, with the first back surface 132 (the second back surface 142) seated on the first seating surface 152 (the second seating surface 162).

The first back surface 132 (second back surface 142) has a pair of substantially arc-shaped first sliding portions 132a and 132b (second sliding portions 142a and 142b) that slide on the second bend-permitting surface 166 (the first bend-permitting surface 156) when the first pin 130 (the second pin 140) rolls on the second rolling surface 143 (the first rolling surface 133).

The first bend-permitting surface 156 (the second-bend-permitting surface 166) is a substantially arc-shaped surface, and has a radius of curvature, throughout its length, greater than the radius of curvature of each of the respective first sliding portions 132a and 132b (the respective second sliding portions 142a and 142b).

The second bend-blocking surface 164 (the first bend-blocking surface 154) of the pin hole, with which the first contact portion 134 (the second contact portion 144) of the first pin 130 (the second pin 140) comes into contact, blocks the adjacent links from bending outward beyond the straight condition as they bend from an inwardly bent condition to the straight condition.

The first contact portion 134 (the second contact portion 144) is always in abutting contact with the first supporting surface 155 (the second supporting surface 165) and the second bend-blocking surface 164 (the first bend-blocking surface 154) in the straight condition.

As shown in FIGS. 1 and 3, when adjacent links of the chain 100 bend in the inward bending direction as a straight portion 109 of the chain engages a sprocket, the second pin 140 (the first pin 130) separates from the first bend-blocking surface 154 (the second bend-blocking surface 164) as the second contact portion 144 (the first contact portion 134) separates from the first bend-blocking surface 154 (the second bend-blocking surface 164). The second pin 140 (the first pin 130) rolls on the first rolling surface 133 (the second rolling surface 143) while a second slide portion 142b (the first slide portion 132b) slides on the first bend-permitting surface 156 (the second bend-permitting surface 166) in the first pin hole 150 (the second pin hole 160).

When the adjacent links in an inwardly bent condition bend outward toward the straight condition as portions 105 and 106 of the chain (FIG. 1) disengaged from the sprockets 3 and 4, the second pin 140 (the first pin 130) rolls in the backward bending direction on the first rolling surface 133 (the second rolling surface 143) while the second contact portion 144 (the first contact portion 134) is out of contact with the first bend-blocking surface 154 (the second bend-blocking surface 164) while the second slide portion 142a (the first slide portion 132a) slides on the first bend-permitting surface 156 (the second bend-permitting surface 166) in the first pin hole 150 (the second pin hole 160).

As the second pin 140 (the first pin 130) continues to roll in the backward bending direction on the first rolling surface 133 (the second rolling surface 143), the second contact portion 144 (the first contact portion 134) engages the first bend-blocking surface 154 (the second bend-blocking surface 164) when the adjacent links reach a straight condition from their inwardly bent condition. Thus, the first bend-blocking surface 154 (the second bend-blocking surface 164) blocks the adjacent links from bending beyond the straight condition in the backward bending direction.

In summary, the cooperating of the bend-blocking surfaces of the link plates with the contact portions of the rocker pins prevents the links of the chain from bending outward relative to each other beyond the straight condition. By preventing adjacent links from being put into an outwardly bent condition, string vibration generated in the free span 104 of the chain 100 due to polygonal action as the chain engages or disengages the sprockets, is suppressed. Suppression of string vibration reduces the noise that would otherwise be generated, and also reduces abrasion that would otherwise occur at the first and second contact portions 134 and 144 of the rocker pins, and at the first and second hole forming surfaces 151 and 161.

In addition, because there is no gap between the first contact portion 134 (the second contact portion 144) and the second bend-blocking surface 164 (the first bend-blocking surface 154) when the adjacent links are in the straight condition, amplitude of the vibration of the free span 104 of the chain is small compared to the amplitude of the vibration that would occur if a gap were created between the contact portions of the rocker pin and the bend-blocking surfaces of the pin holes when the links are in the straight condition. The absence of these gaps enhances the suppression of string vibration and the reduction of noise and abrasion. Configuring the bend-blocking surfaces and the contact portions of the rocker pins so that gaps are avoided when the link plates are in a straight condition also results in reduced noise generated by contact between the contact portions and the bend-blocking surfaces.

The first and second bend-blocking surfaces 154 and 164 are in the form of planes parallel to the pitch plane P when the link plates are in a straight condition. Consequently, tension in the chain acts on the first and second pins 130 and 140 in directions substantially parallel to the first and second bend-blocking surfaces 154 and 164. Therefore, when link plates of the chain are in a straight condition, any component of force due to tension in a direction orthogonal to the first and second bend-blocking surfaces 154 and 164 is smaller than it would be if the bend-blocking surfaces were inclined with respect to the pitch plane. Accordingly, the influence of such component forces applied to the first and second pins 130 and 140 is almost completely eliminated, and drawbacks of such component forces, including contact noise and reduced durability of the pins and link plates of the chain, are avoided.

The first hole forming surface 151 (the second hole forming surface 161) includes the first plane 153 (the second plane 163) that in which the first bend-blocking surface 154 (the second bend-blocking surface 164) is located. When the link plates are arranged in straight condition so that these first and second planes 153 and 163 are located substantially in a common imaginary plane, it is possible to insert the first and second pins 130 and 140 into the respective pin holes 150 and 160 readily so that assembly of the chain is facilitated.

The first and second planes 153 and 154 of all of the first and second pin holes 150 and 160 through which the first and second pins 130 and 140 extend contact the first and second pins 130 and 140 when the link plates are in the straight condition. Consequently, when string vibration occurs, the loads acting on the first and second pins 130 and 140 and on the first and second planes 153 and 163 are dispersed, the maximum stress on the pins and on the plates is reduced, and, as a result, the durability of the pins and the plates is improved.

Figure 4A:
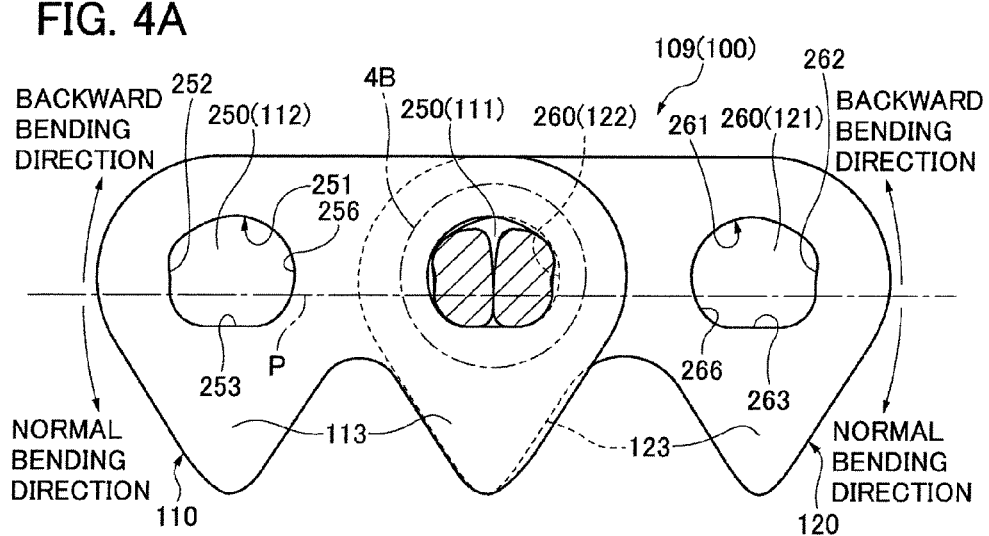
FIGS. 4A and 4B is a cross-sectional view, corresponding to FIG. 3A, of a second embodiment of the invention.
Figure 4B:
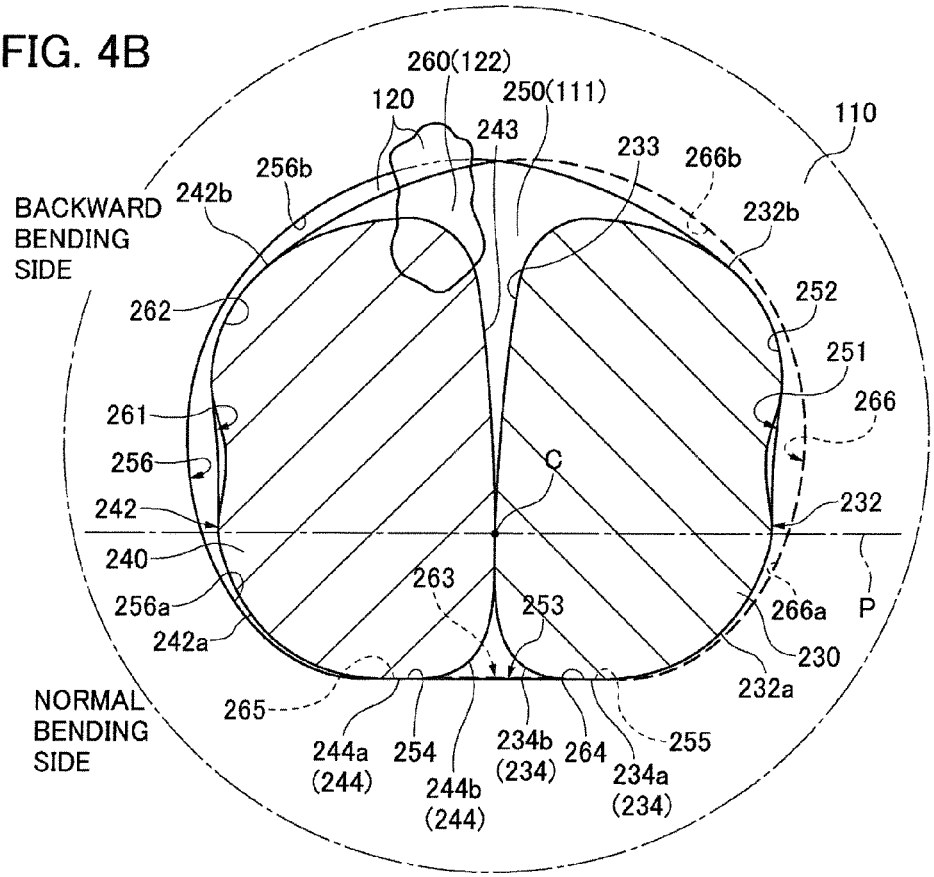

In the second embodiment, illustrated in FIGS. 4A and 4B, parts that correspond to parts in FIGS. 3A and 3B are designated by reference numerals that exceed by one hundred the reference numerals designating the corresponding parts in FIGS. 3A and 3B.

A first hole forming surface 251 (a second hole forming surface 261) forming a first pin hole 250 (a second pin hole 260) has a first seating surface 252 (a second seating surface 262) on which a first pin 230 (second pin 240) seats. The hole a first plane 253 (a second plane 263) that continues smoothly from the first seating surface 252 (the second seating surface 262) and is located at on the side of the pitch plane P toward which the chain bends as it engages a sprocket. A first bend-permitting surface 256 (a second bend-permitting surface 266) continues smoothly from the first plane 253 to the first seating surface 252 (the second seating surface 262).

The first plane 253 (the second plane 263) is a continuous plane, part of which includes a first bend-blocking surface 254 (a second bend-blocking surface 264) and part of which includes a first supporting surface 255 (a second supporting surface 265). The continuous plane is parallel to the pitch plane P when the link plates in which the pin holes are located are in a straight condition. The first plane 253 and the second plane 263 are located on one imaginary plane in the straight condition.

The first pin 230 (the second pin 240) has a first back surface 232 (a second back surface 242) that seats on the first seating surface 252 (the second seating surface 262), a first rolling surface 233 (a second rolling surface 243), and a first contact portion 234 (a second contact portion 244) that continues smoothly to the first back surface 232 (the second back surface 242) from the first rolling surface 233 (the second rolling surface 243). The contact portion of each of the first and second pins is on the side of the pitch plane toward which the chain bends as it comes into engagement with a sprocket. The first contact portion 124 (second contact portion 244) is arranged to contact the second bend-blocking surface 264 (the first bend-blocking surface 254).

The first contact portion 234 (the second contact portion 244) includes a first contact plane 234a (a second contact plane 244a) capable of surface contact with the second bend-blocking surface 264 (the first bend-blocking surface 254), and is in parallel with the second bend-blocking surface 264 (the first bend-blocking surface 254) when the link plates are in the straight condition. The first contact portion 234 (the second contact portion 244) also includes a substantially arc-shaped first curved surface 234b (a second curved surface 244b) that continues smoothly from the first rolling surface 233 (the second rolling surface 243). The first contact plane 234a (the second contact plane 244a) is parallel to the pitch plane P when the chain is in the straight condition.

The first bend-permitting surface 256 (the second bend-permitting surface 266) has a first substantially arc-shaped part 256a (part 266a) that is smoothly continuous with the first plane 253 (the second plane 263) on the side of the pitch plane toward which the chain bends as it engages a sprocket, and a first arc-shaped bend-permitting surface 256b (a second backward bending side bend-permitting surface 266b) that is smoothly continuous with surface 256a (surface 266a) on the other side of the pitch plane.

The first back surface 232 (the second back surface 242) has a pair of substantially arc-shaped first sliding portions 232a and 232b (second sliding portions 242a and 242b) that slide on the second bend-permitting surface 266 (the first bend-permitting surface 256).

When the first pin 230 (the second pin 240) rolls along the second rolling surface 243 (the first rolling surface 233), the first sliding portion 232a (the second slide portion 242a) slides on bend-permitting surface 266a (bend-permitting surface 256a), and the first sliding portion 232b (the second sliding portion 242b) slides the second bend-permitting surface 266b the first bend-permitting surface 256b).

The second bend-blocking surface 264 (the first bend-blocking surface 254) of the pin hole where the first contact portion 234 (the second contact portion 244) of the first pin 230 (the second pin 240) is engageable blocks the adjacent links from being put into a backward bending condition by contact with a first contact plane 234a (a second contact plane 244a) when the adjacent links reach straight condition by bending outward from an inwardly bent condition.

The first contact plane 234a (the second contact plane 244a) is always in abutment with the first supporting surface 255 (the second supporting surface 265).

Therefore, the first contact plane 234a (the second contact plane 244a) is in surface contact with the first supporting surface 255 (the second supporting surface 265) and the second bend-blocking surface 264 (the first bend-blocking surface 254) in a straight portion 109.

When the adjacent links of the straight portion 109 of the chain 100 bend inward, the second pin 240 (the first pin 230) is in out of contact with the first bend-blocking surface 254 (the second bend-blocking surface 264) in the first pin hole 250 (the second pin hole 260) as the second contact plane 244a (the first contact plane 234a) and the second curved surface 244b (the first contact portion 234b) separate from the first bend-blocking surface 254 (the second bend-blocking surface 264). The second pin 240 (the first pin 230) rolls on the first rolling surface 233 (the second rolling surface 243) while the second slide portion 242b (the first slide portion 232b) slides on the first bend-permitting surface 256b (the second bend-permitting surface 266b).

When the adjacent links bend from an inwardly bent condition to a straight condition, the second pin 240 (the first pin 230) rolls on the first rolling surface 233 (the second rolling surface 243) while the second contact plane 244a (the first contact plane 234a) and the second curved surface 244b (the first curved surface 234b) are out of contact with the first bend-blocking surface 254 (the second bend-blocking surface 264), and the second sliding portion 242a (the first sliding portion 232a) slides on the first bend-permitting surface 256 (the second bend-permitting surface 266).

As the second pin 240 (the first pin 230) continues to roll on the first rolling surface 233 (the second rolling surface 243), the second contact plane 244a (the first contact plane 234a) comes into surface contact relationship with the first bend-blocking surface 254 (the second bend-blocking surface 264). This contact occurs as the adjacent links reach a straight condition, and the contact of the contact planes with the bend-blocking surfaces prevents the adjacent links from bending beyond the straight condition to a backwardly bent direction.

As shown also in FIG. 1, it is possible to prevent a non-guide row 102 (the guide row 101) from bending backward beyond the straight condition with respect to the adjacent guide row 101 (the non-guide row 102) because the second contact plane 244a (the first contact plane 234a) of the second pin 240 (the first pin 230) is in surface contact with the first bend-blocking surface 254 (the second bend-blocking surface 264) when the adjacent rows 101 and 102 are in the straight condition. By preventing the adjacent links from being put into a backward bent condition, it is possible to suppress string vibration in the free span 104 of the chain.

In the second embodiment, surface pressures between the first contact portion 234 and the second bend-blocking surface 264 that are in surface contact, and between the second contact portion 244 and the first bend-blocking surface 254 that are also in surface contact, are reduced. Accordingly, it is possible to suppress abrasion in the first and second contact portions 234 and 244 and in the first and second bend-blocking surfaces 254 and 264, and to improve the durability of the first and second pins 230 and 240 and of the first and second plates 110 and 120.

Various modified configurations of the second embodiment are possible. For example, the first bend-blocking surfaces 154 and 254 (the second bend-blocking surfaces 164 and 264) can be disposed in different planes both parallel to the pitch plane P. In this case, the first supporting surfaces 155 and 255 (the second supporting surfaces 165 and 265) will also be disposed in in different.

In another modification, the first bend-blocking surfaces 154 and 254 (the second bend-blocking surfaces 164 and 264) need not be in parallel with the pitch plane P.

The chain transmission can be used in engines other than automobile engines, and may be also used in machines other than engines.

In each case, as the chain travels from one sprocket to another, its free spans, i.e., the spans extending between sprockets are prevented from bending backward, and therefore remain straight unless bent inward by engagement with a sprocket, for example.

Because the chain is prevented from bending backward, string vibration is suppressed, noise and abrasion caused by string vibration are reduced, and the durability of the chain is improved.

The chain of the invention can be a silent chain or any other type of chain composed of interleaved articulating links, such as a roller chain composed of first links each composed of a pair of first link plates and second links each composed of a pair of second link plates.

What is claimed is:

1. A chain, comprising:
    a plurality of first links each composed of one or more first link plates;
    a plurality of second links each composed of one or more second link plates, the first and second links being arranged in alternating relationship with the first and second link plates of each adjacent pair of links being interleaved; and
    a plurality of connecting pins each composed of first and second rocker pins that have mutually engaging surfaces that allow the first and second rocker pins to roll against each other, each of said connecting pins extending through a first pin hole of each link plate of a first link and through a second pin hole of each link plate of an adjacent second link to connect adjacent first and second links together while permitting relative articulating movement of the connected links about pin axes along which said pins extend;
    wherein the permitted articulating movement of the adjacent links of the chain is sufficient to allow the chain, as it comes into engagement with a sprocket, to bend in an inward direction from a straight condition to a bent condition in which it is bent around the sprocket, and, as it disengages from the sprocket, to revert from said bent condition to a straight condition;
    wherein each first pin hole has a flat first bend-blocking surface and each second pin hole has a flat second bend-blocking surface;
    wherein each first rocker pin has a first contact portion capable of mutual contact with one of said flat second bend-blocking surfaces, and each second rocker pin has a second contact portion capable of mutual contact with one of said flat first bend-blocking surfaces,
    wherein said bend-blocking surfaces and contact portions are positioned so that, when a portion of said chain is stretched to a straight condition, said flat second bend-blocking surfaces in said portion of the chain are in contact with said first contact portions in said portion of the chain, and said flat first bend-blocking surfaces in said portion of the chain are in contact with said second contact portions in said portion of the chain, whereby said portion of the chain is prevented from being bent in an outward direction opposite from said inward direction beyond said straight condition;
    wherein each first contact portion is in the form of a plane and capable of surface-to-surface contact with one of said flat second bend-blocking surfaces;
    wherein each second contact portion is in the form of a plane and capable of surface-to-surface contact with one of said flat first bend-blocking surfaces;
    wherein each first contact portion of each connecting pin comes into surface-to-surface contact with one of said flat second bend-blocking surfaces, and each second contact portion of the same connecting pin comes into surface-to-surface contact with one of said flat first bend-blocking surfaces, when the part of the chain in which said connecting pin is located is in said straight condition; and
    wherein said portion of the chain, when in a straight condition, extends along a pitch plane to which said pin axes are parallel, and the first and second bend-blocking surfaces in said portion of the chain are disposed in planes parallel to said pitch plane.

2. The chain according to claim 1, wherein the flat first and second bend-blocking surfaces of the pin holes through which each connecting pin extends are coplanar when the part of the chain in which said connecting pin is located is in a straight condition.

* * * * *